United States Patent [19]

McAdams, Jr.

[11] 3,961,212
[45] June 1, 1976

[54] INTEGRAL SERVOMECHANISM
[75] Inventor: Hugh P. McAdams, Jr., Drexel Hill, Pa.
[73] Assignee: Litton Systems, Inc., Beverly Hills, Calif.
[22] Filed: Dec. 23, 1974
[21] Appl. No.: 535,825

[52] U.S. Cl. .............................. 310/68 R; 310/112; 318/654
[51] Int. Cl.² ................... G05B 11/12; H02K 11/00
[58] Field of Search ........... 310/68, 68 D, 112, 113; 318/654

[56] References Cited
UNITED STATES PATENTS

| 3,135,886 | 6/1964 | Kavanaugh | 310/112 |
| 3,495,108 | 2/1970 | Van Buskirk | 310/68 R |
| 3,530,345 | 9/1970 | Ibrahim et al. | 310/68 R X |

*Primary Examiner*—R. J. Skudy
*Assistant Examiner*—Robert J. Hickey
*Attorney, Agent, or Firm*—M. Michael Carpenter; Alan C Rose; Alfred B. Levine

[57] ABSTRACT

An integral servomechanism is shown that mounts a synchro receiver in the form of a control transformer, a torque motor, an isolation transformer and associated electronic circuitry integrally within a housing wherein the transformer permits the utilization of integrated circuits by providing voltages stepped down from the line voltage while isolating the control transformer from the line voltage.

9 Claims, 2 Drawing Figures

INTEGRAL SERVOMECHANISM

BACKGROUND OF THE INVENTION

The present invention relates to an integral servomechanism and, more particularly, to an improved servomechanism combining a torque motor, synchro receiver, isolation transformer and electronics within a single housing.

The use of synchro-torque systems is well known in the prior art. One application of such a system is for data transmission from a remote location within an aircraft to the cockpit. In this type of system, a synchro transmitter is utilized to provide an electrical indication of an aircraft function, such as the position of a flap to which the synchro transmitter is mechanically coupled. The transmitter generated signal is then applied over connecting electrical wiring to a synchro receiver. The signal drives the rotor of the receiver to a new mechanical position which generates its own signal to balance the received transmitter signal. Such an arrangement is disclosed in my U.S. Pat. No. 3,641,532 that issued on Feb. 8, 1972 entitled "Fault Monitor For Use Within a Synchro-Torque System," which is assigned to the same assignee as the present invention.

When the synchro receiver is to be used for an application which requires additional torque, it is not uncommon in the prior art to combine the synchro receiver with a torque motor. Such an application is shown in U.S. Pat. No. 3,530,345 by F. K. Ibrahim et al., which issued Sept. 22, 1970. This device is intended to replace the synchro receiver within a synchro-torque system with an interchangeable unit that produces greater output torque.

Because the unit shown within the Ibrahim et al. patent is intended as a direct replacement for a synchro receiver, it, by necessity, operates at the same input voltage and frequency as the receiver it replaces, i.e., 90 volts, 60 cycle or 90 volts, 400 cycle. Due to the requirement for a high input voltage, it is not possible to use present-day integrated circuits which operate at voltages lower than the 90 volts in the Ibrahim et al. servomechanism. The solution to this problem is to utilize a transformer or other voltage step-down device between the power supply used in the synchro-torque system and the replacement for a synchro receiver. If this were done, however, the integral servomechanism would not be an interchangeable item. The Ibrahim integral servomechanism is also constructed from non-standard parts and is difficult to repair.

SUMMARY OF THE INVENTION

The present invention provides an integral servomechanism which is easily repaired, utilizes standard parts and may be directly substituted within a servo-torque system while using low-voltage integrated circuits. The servomechanism of the present invention packages standard components including a standard-sized torque motor and a standard-sized synchro receiver in the form of a control transformer within a uniquely structured housing which permits its complete disassembly for easy repair.

The integral servomechanism is further designed to integrally house a transformer that provides a voltage stepdown of the supply voltage to allow the use of integrated circuits and isolates the synchro receiver from the supply voltage.

Accordingly, it is an object of the present invention to provide an integral servomechanism which utilizes standard components that may be easily repaired.

Another object of the present invention is to provide an integral servomechanism which is interchangeable for a synchro receiver used in prior art synchro-torque systems wherein the replacement servomechanism provides additional torque, high input impedance to reduce frequency sensitivity, and isolates the synchro receiver from the line voltages.

Yet another object of the present invention is to provide an integral servomechanism which is capable of utilizing standard integrated circuits that allow the servomechanism to produce greater accuracy and greater torque within the same sized package as the synchro receiver it replaces within a synchro-torque system.

Other objects and many of the appendant advantages of the present invention will become apparent to those skilled in the art after a careful consideration of the following specification and the drawings referenced therein, wherein:

DESCRIPTION OF THE PREFERRED EMBODIMENT

Figure 1:
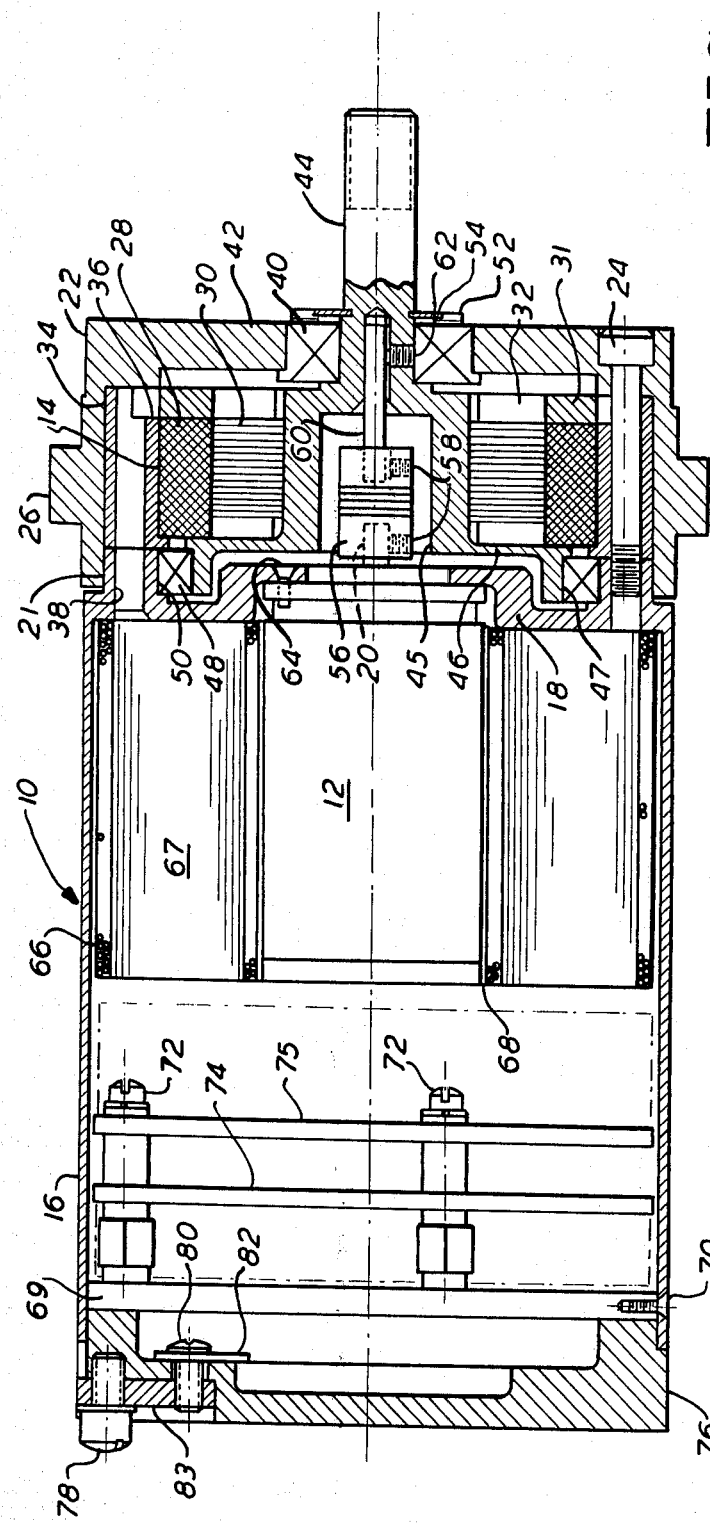
FIG. 1 is a cross-sectional view of an integral servomechanism embodying the present invention.

Referring now to the drawings, FIG. 1 shows a servomechanism 10 which has been cross-sectioned through its center axis to illustrate the standard components contained therein. These standard components include a synchro receiver 12, which in the present embodiment is a control transformer, and a DC torque motor 14. The torque motor may be purchased from Clifton Precision Division of Litton Systems, Inc. as its part number D-1500-C-6, while the control transformer may be purchased from Clifton Precision as its part number CTH-8-HO-4/L912.

The servomechanism 10 includes a tubular cylindrical housing 16 having an end mounting flange 18 which partially closes one end thereof. The control transformer 12 is mounted within the housing 16 with an output shaft 20 extending through the flange opening and beyond. The cylindrical surface of the housing 16 is relieved about its outer surface at the flange 18 to form a shoulder 21 that receives an outer cover frame 22 which is retained upon the flange 18 by screws 24. The outer cover 22 secures the torque motor 14 against the mounting flange 18, while the outer surface of the cover frame 22 is provided with an annular flange 26 for mounting the servomechanism 10 into the servo-torque system, not shown.

The torque motor 14 comprises a stator 28 and rotor 30 with suitable brushes 31 and a commutator 32 mounted respectively on the stator and rotor. The stator 28 is mounted, as by a press fit, in an inner housing frame 34 which is secured to the mounting flange 18 by screws, not shown, that pass through an outer surface 36 of the housing frame. These screws are not shown, as they are offset 120° and do not show in the cross section illustrated. However, a passageway 38 is shown opposite the screw 24 through which wires pass from the cavity of housing 16 through the end flange 18 and the inner housing frame 34 to the torque motor 14 and its brushes 31.

The outer cover frame 22 fits over the inner housing frame 34 and is formed with an annular flange 42 that extends inwardly from the outer frame 22 toward a bearing seat at its center in which is mounted a flanged bearing 40. A shaft 44 rotatably mounts in bearing 40 and extends through the torque motor 14 and is exposed at the inner end thereof. The shaft 44 has a bell-shaped cross section, with the bell-section located below the bearing 40 to form an inner shaft chamber 45. The torque motor rotor 30 mounts, as by a press fit, to the outer surface of the bell-section of shaft 44. Extending outwardly from the innermost end of the bell-section of the shaft is a flat annular flange 46 which terminates at its outer edge in a bearing seat 47. A large diameter bearing 48 is mounted in the bearing seat 47 and then mounted with the shaft 44 in an inner bearing surface 50 formed on the inside of shoulder 21 on the end mounting flange 18.

The flanged bearing 40 is loaded by a spacer stop 52 and a C-shaped lock washer 54 which fits into a groove on the shaft 44. The shaft 44 of the torque motor 14 is coupled to the shaft 20 of the control transformer 12 by a flexible coupler 56. The coupler 56 is secured to the shaft 20 by a set screw 58 and to a separate coupling shaft 60 by a second set screw 58. The internal chamber 45 formed in shaft 44 receives the flexible coupler 56 and is further internally chambered to receive the coupling shaft 60 which is secured to the shaft 44 by a third set screw 62. This arrangement allows a standard torque motor to be uniquely mounted in a foreshortened housing to preserve the overall length of the servomechanism 10.

When it is desired to remove and repair the torque motor 14, the screws 24 are removed, along with the washer 54 and spacer 52 to free the outer frame 22. Once the frame 22 is removed, the brushes 31 may be repaired if necessary. After cover frame 22 is removed, the bearing 40 may be removed from shaft 44 to expose the set screw 62. By loosening set screw 32 and the screws in the surface 36, not shown, it is then possible to remove the inner housing frame 34 and shaft 40 from their mounting position against the end mounting flange 18 and bearing 48, respectively. Before this is done, it is best to place a keeper against the end of the permanent magnetic stator 28 to prevent the demagnetization of the magnets therein. Once inner housing frame 34 is removed, it is possible to replace the stator 28 or rotor 30 within the torque motor 14. With the torque motor 14 removed, screws 64 which mount the control transformer 12 against the end flange 18 may be removed to free the control transformer for repair or replacement.

The inner diameter of the tubular cylindrical housing 16 is substantially larger than the outer diameter of the control transformer 12 for receiving a toroidally wound transformer 66 between the two and against the inner surface of the end flange 18. The wires which form the toroidally wound transformer 66 are wrapped about a tape-wound core 67 formed from a suitable iron tape as is well known in the art. Separating the toroidally wound transformer 66 and the control transformer 12 is a magnetic shield 68 constructed from suitable material, such as mu metal.

The open end of the cylindrical housing 16 is closed by an assembly supported upon an adapter plate 69 which is retained within the housing 16 by screws 70. Mounted upon the adapter plate 69 by standoffs 72 are printed circuit board assemblies 74 and 75 which each mount integrated circuits such as those shown in FIG. 2. On the opposite surface of the adapter plate 69 from the standoffs 72 is a terminal cap 76 which is attached to the adapter plate by screws, not shown. A plurality of terminal lugs 78 is mounted about the periphery of the terminal cap 76 to which external wiring may be attached for electrically connecting the integral servomechanism 10 into the servo-torque system. Screws 80 connect solder lugs 82 to metal plates 83 into which the lugs 78 are fastened to pass electrical current through the terminal cap 76 to the printed circuit board assemblies.

The assembly formed by the hardware attached to the adapter plate 69 may be disassembled by removing screws 70 which allows the full assembly to be removed from the integral servomechanism for repair or replacement. An insulated spacer, not shown, between the innermost printed circuit board assembly 75 and the toroidally wound transformer 66 serves to retain that transformer in the position shown until the servomechanism 10 is disassembled. Alternately, the transformer may be potted in the position shown or retained by a large C-ring.

Figure 2:
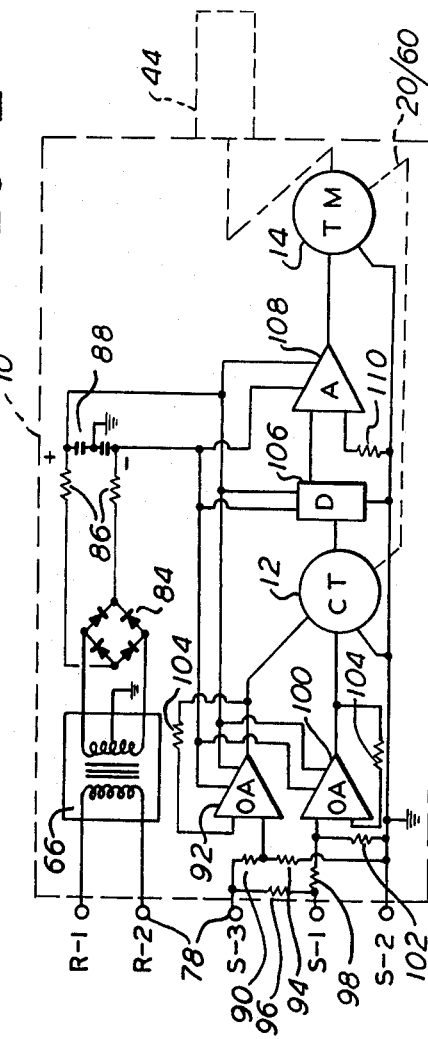
FIG. 2 is a schematic of the integral servomechanism shown in FIG. 1.

Referring now to FIG. 2, the schematic of the components contained within the integral servomechanism 10 is shown which illustrates additional advantages provided by the present invention. Terminal lugs 78 marked "R-1" and "R-2" are connected to the primary winding of the transformer 66. The secondary winding of the transformer is provided with a center tap connected to ground while the terminals on each end are connected to two opposing terminals of a rectifier bridge formed from four diodes 84 connected in a standard arrangement. The remaining two terminals of the diode bridge connect through resistors 86 to positive and negative DC output terminals each connected through capacitors 88 to ground to provide filtering.

Additional terminal lugs 78 form three input terminals marked "S-1" through "S-3" which connect the integral servomechanism and the control transformer 12 therein to a synchro transmitter, not shown, Terminal S-3 connects through a resistor 90 to an input terminal of an operational amplifier 92 and then through a second resistor 94 to the input terminal marked S-2 which is, in turn, connected to ground. Input terminal S-1 is connected to input terminal S-3 through a third resistor 96 and connected via a fourth resistor 98 to an input terminal of a second operational amplifier 100. The junction between the fourth resistor 98 and the input of operational amplifier 100 is connected to ground through a fifth resistor 102 to complete a delta-connected input resistor network between the three input terminals S-1 through S-3 and the two operational amplifiers 92 and 100.

Amplifier 92 and 100 are each connected through a resistance network formed by resistors 104 to a second input terminal to establish the amplifiers as operational amplifiers, as is conventionally known. Each amplifier 92 and 100 is powered by current from the positive and negative terminals of the rectifier circuit which has been stepped-down from the input voltage applied to lugs R-1 and R-2 by the transformer 66.

The AC signal generated by a transmitter and amplified by the operator amplifiers 92 and 100 is applied to the rotor of the control transformer 12 as is known in servo circuitry. The AC error signal from the rotor of the control transformer 12 is converted from an AC signal to a DC signal in a demodulator 106 and applied to an input terminal of an amplifier 108 which is, like amplifiers 92 and 100, powered by the rectifier circuit. The second input terminal of amplifier 108 is connected to terminal S-2 and ground through a resistor 110. The amplified error signal from amplifier 108 is then applied to an input terminal of the torque motor 14 whose second input terminal is connected to terminal S-2. As shown in FIG. 1, the control transformer 12 is mechanically connected to the torque motor 14 by the shafts 20 and 60 and coupling 58, while the output of the servomechanism 10 is applied by the torque motor 14 to its shaft 44.

The delta-connected resistive network comprising resistors 90, 94, 96, 98 and 102 presents a high-impedance load to the input from the synchro transmitter which is not frequency sensitive as in prior art devices. The two voltages across terminals S-1 through S-3 which are presented to the isolator amplifiers formed by operational amplifiers 92 and 100 are amplified and applied to the stator windings of the control transformer 12. As the synchro transmitter changes its position, a signal is generated and applied through the amplifiers 92 and 100 to the control transformer 12. If the control transformer rotor is not in the same position as the rotor position of the synchro transmitter, an error signal is generated which represents the difference between the mechanical position of the two rotors. This error signal generated by the control transformer rotor is, in the present invention, an AC signal which is demodulated by the demodulator 106 and applied to amplifier 108 as a DC signal. The output from amplifier 108 in turn drives the torque motor 104 which assists in increasing the torque output of the servomechanism 10 as well as driving the rotor of the control transformer 12 to a position where the error signal generated across its windings is reduced to zero when compared to the signal received from the synchro transmitter.

The transformer 66 provides isolation between the signal input terminals S-1 through S-3 and the line voltage input terminals R-1 and R-2. This same transformer also provides isolation between the rotors of the servo-torque system and the system stators.

Due to the unique configuration of the integral servomechanism 10 and its inner housing frame 34, outer cover frame 22 and shaft 40 which mount the torque motor 14 upon the housing 16, it is possible to completely disassemble the torque motor 14 and control transformer 12 from the servomechanism 10 to expedite repairs. This unique structure also permits the utilization of a standard-sized control transformer and torque motor. The arrangement further permits the utilization of an integral transformer which allows the use of low-voltage integrated circuits for greater flexibility of circuit design while providing isolation between the components within the integral structure. Other modifications of the present invention, including modifications of the circuitry illustrated in FIG. 2, will become apparent to those skilled in the art after careful consideration of the foregoing.

The embodiments of the invention in which an exclusive property or privilege is claimed are defined as follows:

1. An integral servomechanism comprising:
   a tubular cylindrical housing having a mounting flange partially closing one end;
   control transformer means mounted within said housing on said mounting flange and having an output shaft extending through said partially closed end;
   torque motor means including frame means externally mounted on said mounting flange and having stator means, rotor means and shaft means;
   said shaft means having a bell-shaped cross section forming an internal hollow chamber; and
   flexible coupling means mounted in said internal hollow chamber of said torque motor shaft means for joining said shaft to said control transformer output shaft.

2. An integral servomechanism as claimed in claim 1 additionally comprising transformer means internally mounted within said tubular housing between said control transformer means and said housing for electrically isolating said control transformer.

3. An integral servomechanism as claimed in claim 2 wherein said transformer means is wound upon a toroidally shaped iron core for slidably fitting between said control transformer and said tubular housing adjacent said mounting flange.

4. An integral servomechanism as claimed in claim 1 additionally comprising:
   said shaft means of said torque motor means having an annular flange outwardly extending from the innermost end of said bell-shaped cross section and terminating at the outermost edge of said flange in a bearing seat;
   bearing means mounted upon said housing mounting flange; and
   said bearing seat in said annular flange of said shaft means mounted upon said bearing means.

5. An integral servomechanism as claimed in claim 1 additionally comprising said shaft means of said torque motor means exposed at each end of said torque motor, said bell-shaped cross section having a rotor-receiving surface on its outer surface opposite said internal hollow chamber for mounting said rotor means on said outer surface while receiving said flexible coupling means inside said rotor means at one of said exposed ends of said shaft means thereby shortening the length of said integral servomechanism.

6. An integral servomechanism comprising:
   a tubular housing having a mounting flange partially closing one end;
   a control transformer mounted within said housing on said mounting flange having an output shaft extending through said partially closed end;
   a torque motor externally mounted on said mounting flange having a shaft exposed at each end of said torque motor;
   flexible coupling means for joining said torque motor shaft to said control transformer output shaft; and
   a toroidally wound transformer internally mounted between said control transformer and said tubular housing adjacent said mounting flange for electrically isolating said control transformer.

7. An integral servomechanism as claimed in claim 6 additionally comprising:
   a housing cap assembly for closing said tubular housing opposite said mounting flange;
   power terminal means and signal terminal means mounted upon said cap assembly;
   printed circuit board assemblies mounted upon said cap assembly within said tubular housing and connected electrically to said signal terminal means;

said toroidally wound transformer connected electrically between said power terminal means and said printed circuit board assemblies, whereby said signal terminal means are isolated from said power terminal means within said integral servomechanism.

8. An integral servomechanism as claimed in claim 7 additionally comprising:
operational amplifier means;
a delta-connected resistor network connecting said signal terminal means to said operational amplifier means to provide a high input impedance thereto; and
a rectifier network connected between said toroidally wound transformer and said operational amplifier means to provide a low operating voltage thereto.

9. An integral servomechanism as claimed in claim 6 wherein said shaft of said torque motor exposed at the end of said motor adjacent said mounting flange is bell-shaped in cross section to form an inner hollow chamber which extends into said torque motor, and said flexible coupling means for joining said torque motor shaft to said control transformer output shaft is attached to said shaft such that said torque motor shaft encloses said coupling means within said inner hollow chamber.

* * * * *